(12) United States Patent
Choi

(10) Patent No.: US 11,598,359 B2
(45) Date of Patent: Mar. 7, 2023

(54) CONNECTOR, FRAME UNIT AND BUNK BED FRAME HAVING SAME

(71) Applicant: Inno-Sports Co., Ltd., Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 182 days.

(21) Appl. No.: 16/929,425

(22) Filed: Jul. 15, 2020

(65) Prior Publication Data

US 2021/0025423 A1    Jan. 28, 2021

(30) Foreign Application Priority Data

Jul. 25, 2019   (CN) .......................... 201921183754.X

(51) Int. Cl.
| | | |
|---|---|---|
| *F16B 12/54* | (2006.01) | |
| *F16B 12/32* | (2006.01) | |
| *A47C 19/02* | (2006.01) | |
| *A47C 19/20* | (2006.01) | |

(52) U.S. Cl.
CPC ............ *F16B 12/54* (2013.01); *A47C 19/027* (2013.01); *A47C 19/20* (2013.01); *F16B 12/32* (2013.01)

(58) Field of Classification Search
CPC .......... F16B 12/54; F16B 12/32; F16B 12/40; F16B 12/56; A47C 19/027; A47C 19/025; A47C 19/20; A47C 19/202; A47C 19/005; A47C 19/02; A47C 19/021; A47C 23/06; A47C 23/061; A47C 23/062
See application file for complete search history.

(56) References Cited

U.S. PATENT DOCUMENTS

| | | | | |
|---|---|---|---|---|
| 1,408,553 | A | * | 3/1922 | Wedemann ............. F16B 12/40 403/231 |
| 3,605,142 | A | * | 9/1971 | Weinhart ............. A47C 23/067 5/238 |
| 4,292,003 | A | * | 9/1981 | Pond ........................ F16B 5/10 403/231 |
| D649,016 | S | * | 11/2011 | Rasmussen .................... D8/354 |

(Continued)

FOREIGN PATENT DOCUMENTS

| | | | | |
|---|---|---|---|---|
| DE | 202006005077 U1 | * | 7/2006 | ........... A47C 23/062 |
| FR | 2726984 A1 | * | 5/1996 | ............. A47C 23/06 |
| KR | 20180080841 A | * | 7/2018 | ........... A47C 19/025 |

*Primary Examiner* — David R Hare
*Assistant Examiner* — Alison N Labarge
(74) *Attorney, Agent, or Firm* — Morgan, Lewis & Bockius LLP

(57) ABSTRACT

A frame unit includes first and second bars spaced apart from each other, third bars disposed between the first and second bars, and connectors removably connecting the third bars with the first and second bars. A connector includes a body fixedly connected with the first or second bar, a casing defining an interior to receive an end of a third bar, and a slot allowing insertion of the end of the third bar into the casing. The interior defined by the casing has narrow and wide sides corresponding to the narrow and wide sides of the end of the third bar. As such, when the end of the third bar is inserted into the casing, the end of the third bar is prevented from any translational movement within the casing. The connectors allow quick and easy connection of bars, and in the meantime enhance the stability of the frame unit.

18 Claims, 10 Drawing Sheets

(56) References Cited

U.S. PATENT DOCUMENTS

| | | | |
|---|---|---|---|
| 2003/0091386 A1* | 5/2003 | Ting | F16B 12/40 403/408.1 |
| 2010/0180379 A1* | 7/2010 | Leng | A47C 21/08 5/425 |
| 2018/0372138 A1* | 12/2018 | Li | A47C 19/20 |
| 2019/0099006 A1* | 4/2019 | Gerig | A47C 23/06 |

* cited by examiner

CONNECTOR, FRAME UNIT AND BUNK BED FRAME HAVING SAME

CROSS-REFERENCE TO RELATED APPLICATIONS

The present application claims priority to Chinese Utility Model Application CN 201921183754.X filed Jul. 25, 2019. The disclosure of the application is incorporated herein for all purposes by reference.

FIELD OF THE INVENTION

The present invention generally relates to bed frames, and more particularly, to connectors, frame units and bunk bed frames.

BACKGROUND

A bed frame usually includes a peripheral frame and interior bars disposed in the interior space defined by the peripheral frame. Of many conventional bed frames, holes are formed along the peripheral frame and metal sheets are attached at the ends of the interior bars. The metal sheets are inserted into the holes formed at the peripheral frame to connect the interior bars with the peripheral frame. Such connections, however, are not robust nor stable. In some cases, the metal sheets are likely to bend or deform after multiple assembling/disassembling operations or long time use. The bended or deformed metal sheets often lead to a sloped or uneven bed surface, making the bed unusable or uncomfortable.

Given the current state of the art, there remains a need for connectors, frame units and bed frames that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present invention provides support assemblies and foldable bed frames that are convenient to use and transport.

In various exemplary embodiments, the present invention provides a frame unit including a first bar and a second bar disposed in a first direction and spaced apart from each other. The frame unit also includes a plurality of third bars disposed between the first and second bars in a second direction that is substantially perpendicular to the first direction. Each third bar in the plurality of third bars includes a first end adjacent to the first bar and a second end adjacent to the second bar. Each of the first and second ends has an oblong cross-section with a narrow side and a wide side, wherein the narrow side has a width and the wide side has a length greater than the width. The frame unit further includes a plurality of first connectors configured to connect the first ends of the plurality of third bars with the first bar and connect the second ends of the plurality of third bars with the second bar. A respective first connector in the plurality of first connectors includes a body, a casing and a slot. The body is fixedly connected with the first or second bar. The casing is integrally formed with the body and extends in the second direction. The casing defines an interior to receive the first or second end of a corresponding third bar in the plurality of third bars. The slot is formed between a first edge and a second edge of the casing. The slot has a width that is equal to or greater than the width of the oblong cross-section of the first or second end of the corresponding third bar and less than the length of the oblong cross-section of the first or second end of the corresponding third bar. As the slot allows the first or second end of the corresponding third bar to insert into the casing or remove from the casing when the narrow side of the oblong section of the first or second end of the corresponding third bar is aligned with the slot. The interior defined by the casing has a narrow side and a wide side corresponding to the narrow side and the wide side of the oblong section of the first or second end of the corresponding third bar. As such, the casing prevents translational movement of the first or second end of the corresponding third bar within the interior when the narrow and wide sides of the oblong section of the first or second end of the corresponding third bar are aligned with the narrow and wide sides of the interior defined by the casing.

In some exemplary embodiments, one or more edges of the first or second end of the corresponding third bar along the section direction are chamfered to facilitate easy insertion of the first or second end of the corresponding third bar into the casing of the respective first connector or easy removal of the first or second end of the corresponding third bar from the casing of the respective first connector.

In some exemplary embodiments, the interior defined by the casing of the respective first connector has an oblong cross-section corresponding to the oblong cross-section of the first or second end of the corresponding third bar such that the casing sleeves onto the first or second end of the corresponding third bar.

In an exemplary embodiment, the casing covers circumferentially up to about 50%, 60%, 70%, 80% or 90% of the first or second end of the corresponding third bar.

In some exemplary embodiments, the casing includes a lower holding segment to support the first or second end of the corresponding third bar. The casing also includes a first lower corner segment at a first side of the lower holding segment along the first direction, and a second lower corner segment at a second side of the lower holding segment along the first direction. The first and second lower corner segments prevent translational movement of the first or second end of the corresponding third bar within the interior along the first direction.

In some exemplary embodiments, the casing further includes an upper segment to prevent translational movement of the first or second end of the corresponding third bar within the interior along a third direction that is substantially perpendicular to the first and second direction.

In an exemplary embodiment, the casing further includes a side segment between the upper segment and the second lower corner segment and connected with the upper segment and the second lower corner segment.

In an exemplary embodiment, the slot is formed between the upper segment and the first lower corner segment.

In some exemplary embodiments, the frame unit further includes a fourth bar disposed between the first and second bars in the second direction. The fourth bar has a first end adjacent to the first bar and a second end adjacent to the second bar, and each of the first and second ends of the fourth bar includes a slot facing downward and a protrusion facing the first or second bar. The frame unit also includes a pair of second connectors configured to connect the first and second ends of the fourth bar with the first and second bars. Each second connector includes a body, a deck, a tooth and a hole. The body is fixedly connected with the first or second bar. The deck extends in the second direction to support the first or second end of the fourth bar. The tooth is formed at the deck and bended upwardly to insert into the slot of the first or second end of the fourth bar. The hole is formed at the body to receive the protrusion of the first or second end of the fourth bar.

In some exemplary embodiments, the frame unit includes a fourth bar disposed between the first and second bars in the second direction. The fourth bar has a first end adjacent to the first bar and a second end adjacent to the second bar, and each of the first and second ends of the fourth bar includes a slot facing downward. The frame unit also includes a pair of couplers, each including a body coupled with the first or second end of the fourth bar and a protrusion integrally formed with the body thereof and facing the first or second bar. The frame unit further includes a pair of second connectors configured to connect the first and second ends of the fourth bar with the first and second bars. Each second connector includes a body, a deck, a tooth and a hole. The body is fixedly connected with the first or second bar. The deck extends in the second direction to support the first or second end of the fourth bar. The tooth is formed at the deck and bended upwardly to insert into the slot of the first or second end of the fourth bar. The hole is formed at the body to receive the protrusion of the coupler at the first or second end of the fourth bar.

In an exemplary embodiment, the coupler is press-fitted or snap-fitted with the first or second end of the fourth bar.

In various exemplary embodiments, the present disclosure provides a frame unit including a first bar, a second bar, a fourth bar, a pair of couplers, and a pair of connectors. The first and second bars are disposed in a first direction and spaced apart from each other. The fourth bar is disposed between the first and second bars in a second direction that is substantially perpendicular to the first direction. The fourth bar includes a first end adjacent to the first bar and a second end adjacent to the second bar, and each of the first and second ends of the fourth bar includes a slot facing downward. Each coupler includes a body coupled with the first or second end of the fourth bar and a protrusion integrally formed with the body thereof and facing the first or second bar. The second connectors are configured to connect the first and second ends of the fourth bar with the first and second bars. Each second connector includes a body, a deck, a tooth, and a hole. The body is fixedly connected with the first or second bar. The deck extends in the second direction to support the first or second end of the fourth bar. The tooth is formed at the deck and bended upwardly to insert into the slot of the first or second end of the fourth bar. The hole is formed at the body to receive the protrusion of the coupler at the first or second end of the fourth bar.

In an exemplary embodiment, the protrusion of each coupler has an end surface slanted from an upper portion to a lower portion of the protrusion.

In various exemplary embodiments, the present disclosure provides a bunk bed frame including first, second, third and fourth posts, each including an upper segment and a lower segment. The bunk bed frame also includes an upper frame unit connected with the upper segments of the first, second, third and fourth posts, and a lower frame unit disposed below the upper frame unit and connected with the lower segments of the first, second, third and fourth posts. At least one of the upper and lower frame units is configured according to a frame unit disclosed herein, of which the first bar has a first end connected with the first post and a second end connected with the second post, and the second bar has a first end connected with the third post and a second end connected with the fourth post. The bunk bed frame optionally further includes a ladder having an upper end connected with the upper frame unit to allow access to the upper frame unit.

In an exemplary embodiment, the upper and lower segments of one or more respective posts in the first, second, third and fourth posts are integrally formed with each other.

In some exemplary embodiments, the upper and lower segments of one or more respective posts in the first, second, third and fourth posts are separate parts and connected at adjacent ends thereof.

In an exemplary embodiment, a lower end of the upper segment of one or more posts is inserted into an upper end of the lower segment of the respective post, or the upper end of the lower segment of one or more posts is inserted into the lower end of the upper segment of the respective post.

In some exemplary embodiments, each of the upper and lower frame units is configured according to a frame unit disclosed herein.

In some exemplary embodiments, the bunk bed frame further includes a guardrail connected with one or more of the upper segments of the first, second, third and fourth posts.

The connectors, frame units and bed frames of the present invention have other features and advantages that will be apparent from or are set forth in more detail in the accompanying drawings, which are incorporated herein, and the following Detailed Description, which together serve to explain certain principles of exemplary embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of exemplary embodiments of the invention.

Figure 1:
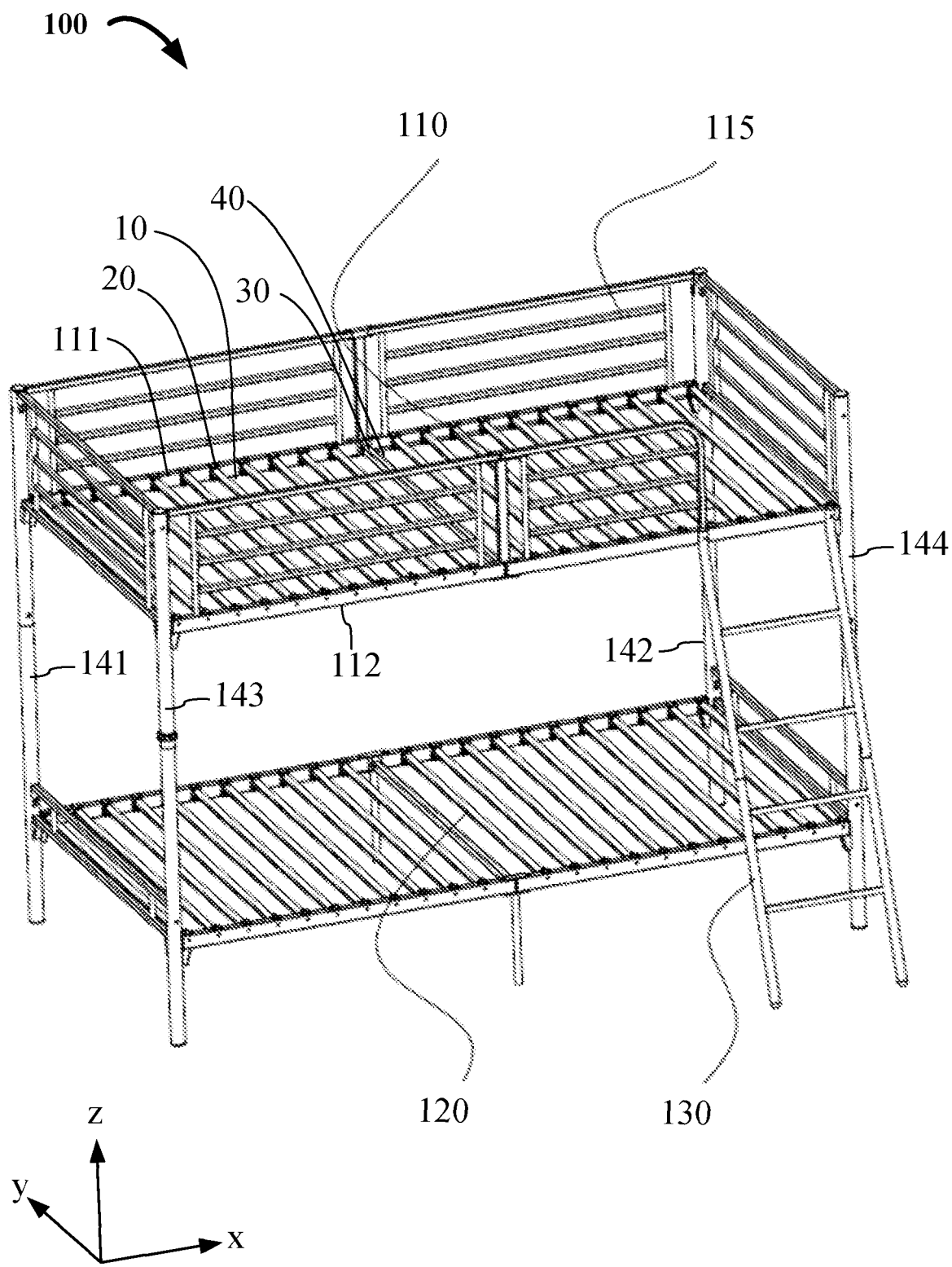
FIG. 1 is a schematic perspective view illustrating a bunk bed frame in accordance with some exemplary embodiments of the present invention.

As will be apparent to those of skill in the art, the components illustrated in the figures described above are combinable in any useful number and combination. The figures are intended to be illustrative in nature and are not limiting.

DETAILED DESCRIPTION

Reference will now be made in detail to implementation of exemplary embodiments of the present disclosure as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present disclosure will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the exemplary embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present invention are described in the context of connectors for connecting bars and frame units having such connectors. The frame units of the present disclosure are of various sizes including but not limited to twin, full, queen and king sizes, and of various shapes including but not limited to rectangles and squares. Moreover, the frame units can be made of various materials including but not limited to metals such as steel, plastics and woods. Further, the frame units can be used alone or combined to make various different types of bed frames including but not limited to foldable bed frames and bunk bed frames.

A frame unit of the present disclosure generally includes first and second bars spaced apart and substantially parallel to each other. The first and second bars are often disposed along the lateral or longitudinal direction of the frame unit. A frame unit also includes a plurality of third bars and a plurality of first connectors. The first connectors are configured to removably connect the plurality of third bars with the first and second bars and to prevent translational movement of the third bars once connected. As such, the first connectors along with the third bars enhance the stability of the frame unit. In some exemplary embodiments, a frame unit further includes a fourth bar and a pair of second connectors. The second connectors are configured to fixedly couple the fourth bar with the first and second bars. As such, the second connectors along with the fourth bar further enhance the stability of the frame unit.

For instance, referring to FIG. 1, frame unit 110 includes a first bar such as first bar 111 and a second bar such as second bar 112. The first and second bars are disposed in a first direction (e.g., x-direction) and spaced apart from each other. Frame unit 110 also includes a plurality of third bars such as third bar 10 and/or a fourth bar such as fourth bar 40. Third bar 10 or fourth bar 40 is disposed between the first and second bars in a second direction (e.g., y-direction), and has a first end adjacent to the first bar and a second end adjacent to the second bar. It should be noted that the term "end" of a part (e.g., a bar) as used herein refers to a tip and/or a portion adjacent the tip of the part. In an exemplary embodiment, the second direction is substantially perpendicular to the first direction, e.g., the third or fourth bar is substantially perpendicular to the first or second bar. The first, second, third or fourth bar can be a one-piece bar or a bar made of two or more bar segments. Frame unit 110 further includes connectors such as connector 20 to connect third bar 10 with the first and second bars, and/or connector 30 to connect fourth bar 40 with the first and second bars.

Figure 10:
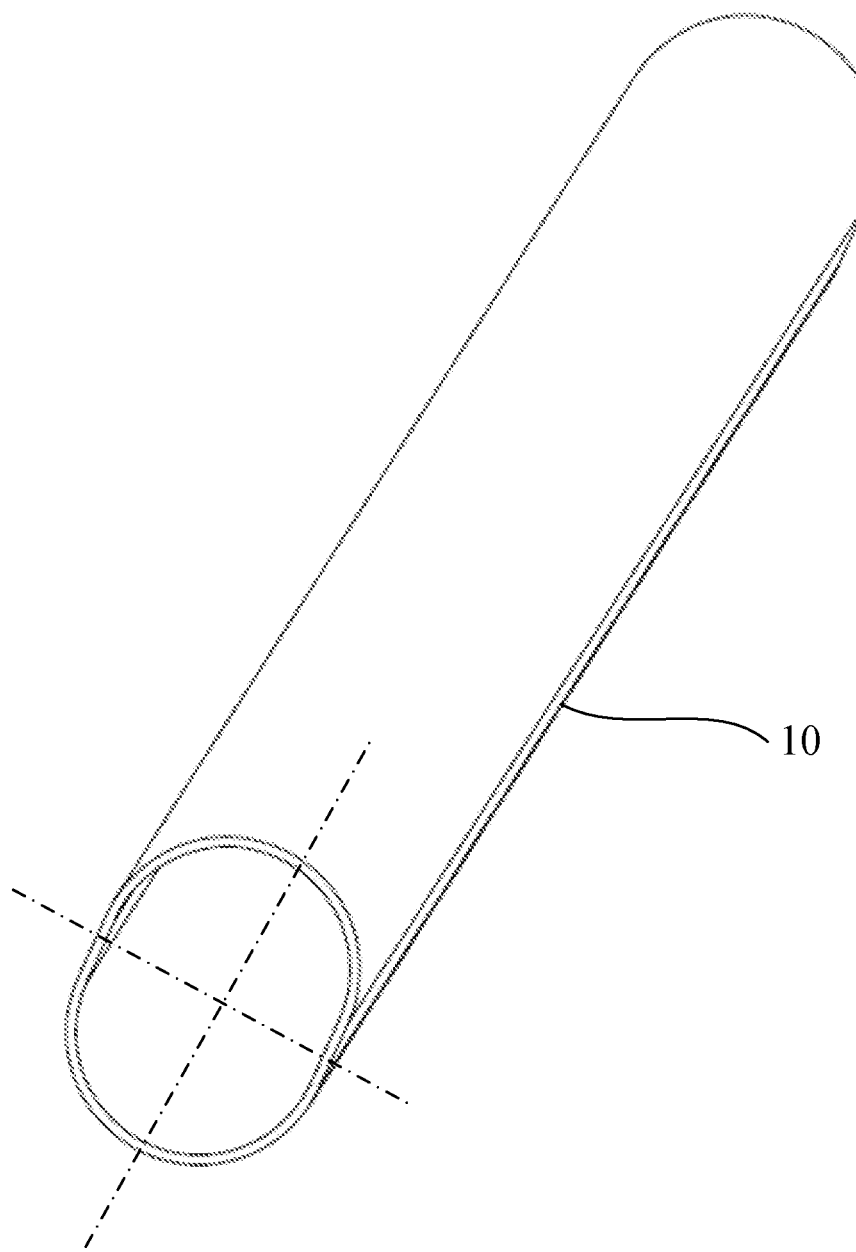
FIG. 10 is a schematic perspective view illustrating another bar in accordance with some exemplary embodiments of the present invention.

Referring to FIG. 10, in some exemplary embodiments, one or each of the first and second ends of third bar 10 has an oblong cross-section with a narrow side having a width and a wide side having a length that is greater than the width. Examples of an oblong cross-section include but are not limited to rectangle, rectangle with one or more rounded/chamfered corners, ellipse and oval. In an exemplary embodiment, third bar 10 has a generally uniform oblong cross-section.

Referring to FIGS. 2-3 and 6-7, in some exemplary embodiments, connector 20 is configured to removably connect the end (e.g., the first or second end) of third bar 10 with the first or second bar. In some exemplary embodiments, connector 20 includes a body such as body 21, a casing such as casing 50 and a slot such as slot 23. Body 21 is fixedly connected with the first or second bar, for instance, by a fastener, an adhesive, snap-fitting, welding or any other suitable means. Casing 50 is integrally formed with the body. When connector 20 is coupled with the first or second bar, casing 50 extends in the second direction and defines an interior to receive the first or second end of third bar 10.

To facilitate insertion of the end of third bar 10 into the interior of the casing or removal of the end of third bar 10 from the interior of the casing, a slot such as slot 23 is formed at the casing, for instance, between a first edge such as edge 28 and a second edge such as edge 29 of the casing that are substantially in the second direction. In some exemplary embodiments, the width of the slot (e.g., a distance between the first and second edges of the casing) is equal to or greater than the width of the oblong cross-section of the end of third bar 10 and less than the length of the oblong cross-section of the end of third bar 10. As such, the slot allows the insertion or removal of the end of the third bar when the narrow side of the oblong cross-section of the end of third bar 10 is aligned with the slot. In an exemplary embodiment, the width of the slot is substantially equal to the width of the oblong cross-section of the end of third bar 10. As such, the slot allows the insertion or removal of the end of the third bar only when the narrow side of the oblong cross-section of the end of third bar 10 is substantially aligned with the slot. To aid insertion into or removal from the casing, one or more edges of the end of the third bar along the second direction are chamfered such that the oblong cross-section is of a rectangle with one or more rounded/chamfered corners, an ellipse, an oval or the like.

The presence of the rounded/chamfered corner(s) at the end of the third bar allows smooth entry or removal of the end of the third bar.

In some exemplary embodiments, the interior defined by the casing has a narrow side and a wide side corresponding to the narrow side and the wide side of the oblong cross-section of the end of the corresponding third bar. As such, when the narrow and wide sides of the oblong cross-section of the end of the third bar are aligned with the narrow and wide sides of the interior defined by the casing, the end of the third bar is not allowed to move in the first and third directions (e.g., x-direction and z-direction). In other words, when the narrow and wide sides of the oblong cross-section of the end of the third bar are aligned with the narrow and wide sides of the interior defined by the casing, the casing prevents translational movement of the end of the third bar within the interior defined by the casing. For instance, the casing prevents the third bar from moving up and down, or left and right within the casing of the connector.

In some exemplary embodiments, the interior defined by the casing has an oblong cross-section corresponding to the oblong cross-section of the end of the third bar such that the casing sleeves on the end of the third bar and covers circumferentially a portion of the end of the third bar. For instance, in an exemplary embodiment, the casing covers circumferentially up to about 50%, 60%, 70%, 80% or 90% of the end of the third bar.

In some exemplary embodiments, the casing includes a plurality of continuous or discontinuous segments. For instance, in some exemplary embodiments, the casing includes lower holding segment 22, first lower corner segment 24 and second lower corner segment 25. It should be noted that the term "corner segment" of the casing is described in the context of the cross-section of the interior defined by the casing. Lower holding segment 22 is configured to support the end of the third bar. The first lower corner segment is formed at a first side of the lower holding segment along the first direction, and the second lower corner segment is formed at a second side of the lower holding segment along the first direction. The first and second lower corner segments are curved upwardly to prevent translational movement of the end of the third bar within the interior along the first direction.

In some exemplary embodiments, the casing includes upper segment 26. Along with the lower holding segment, first lower corner segment and/or second lower corner segment, the upper segment prevents translational movement of the end of the third bar within the interior along the third direction (e.g., z-direction). In an exemplary embodiment, upper segment 26 is a corner segment.

Figure 7:
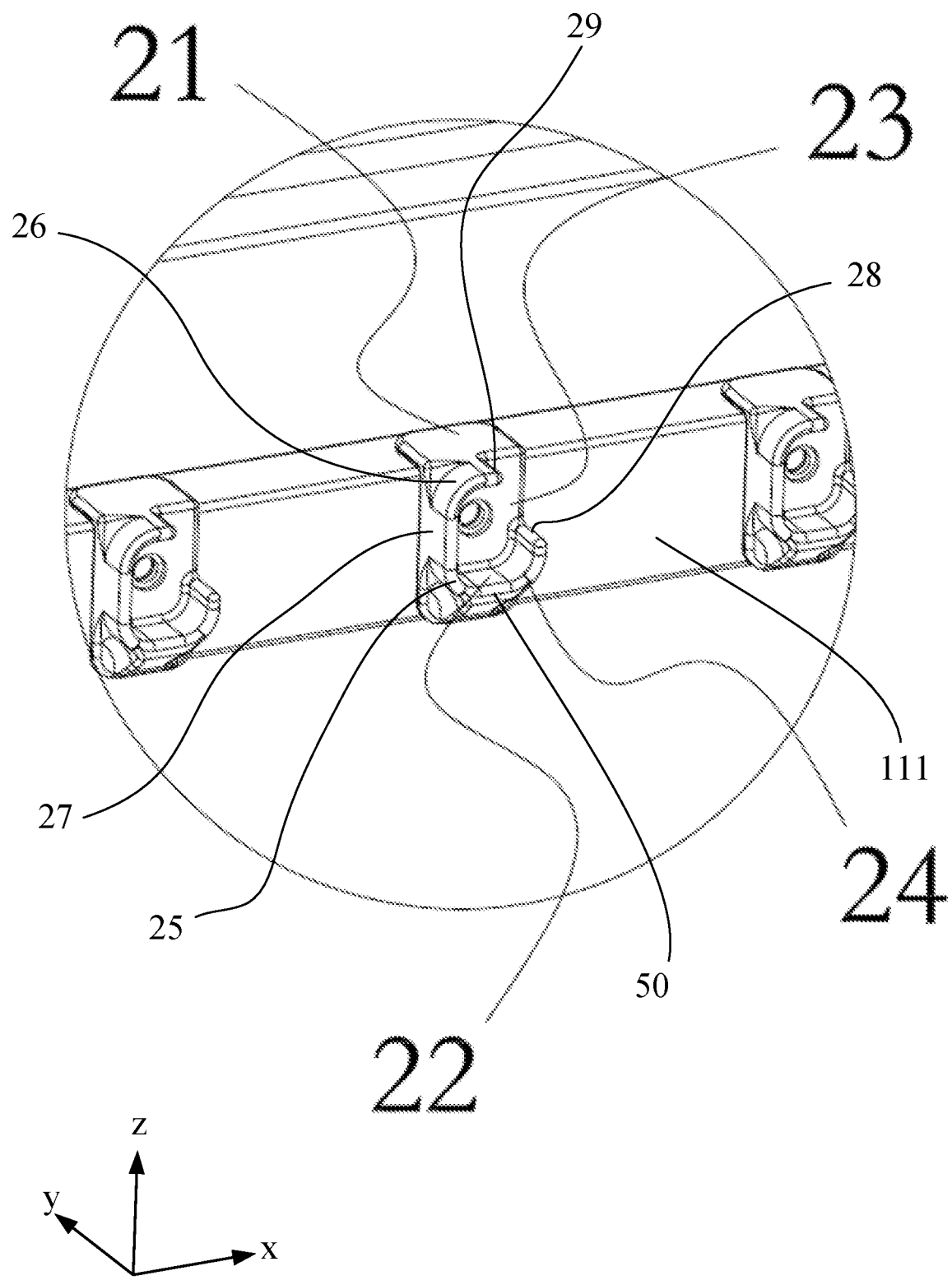
FIG. 7 is an enlarged view taken along circle C of FIG. 6.

In an exemplary embodiment, the casing further includes a side segment between the upper segment with the first or second lower corner segment and connected with the upper segment with the first or second lower corner segment. For instance, by way of example, FIG. 7 illustrates side segment 27 between the upper segment and the second lower corner segment and connected with the upper segment and the second lower corner segment. In such an embodiment, the slot is formed between the upper segment and the first lower corner segment.

Figure 4:
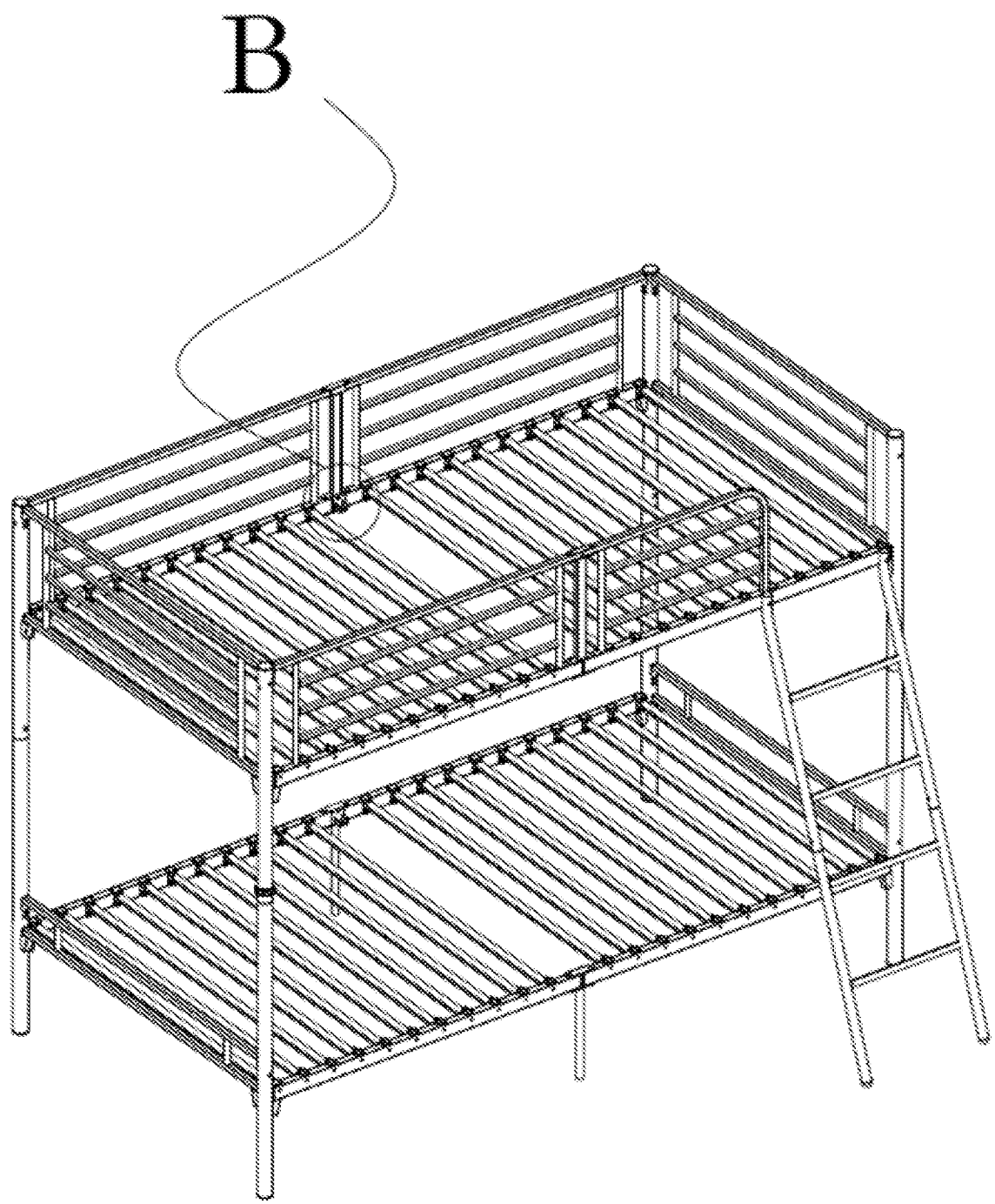
FIG. 4 is a schematic perspective view illustrating the bunk bed frame of FIG. 1 in a second partially disassembled state.
Figure 5:
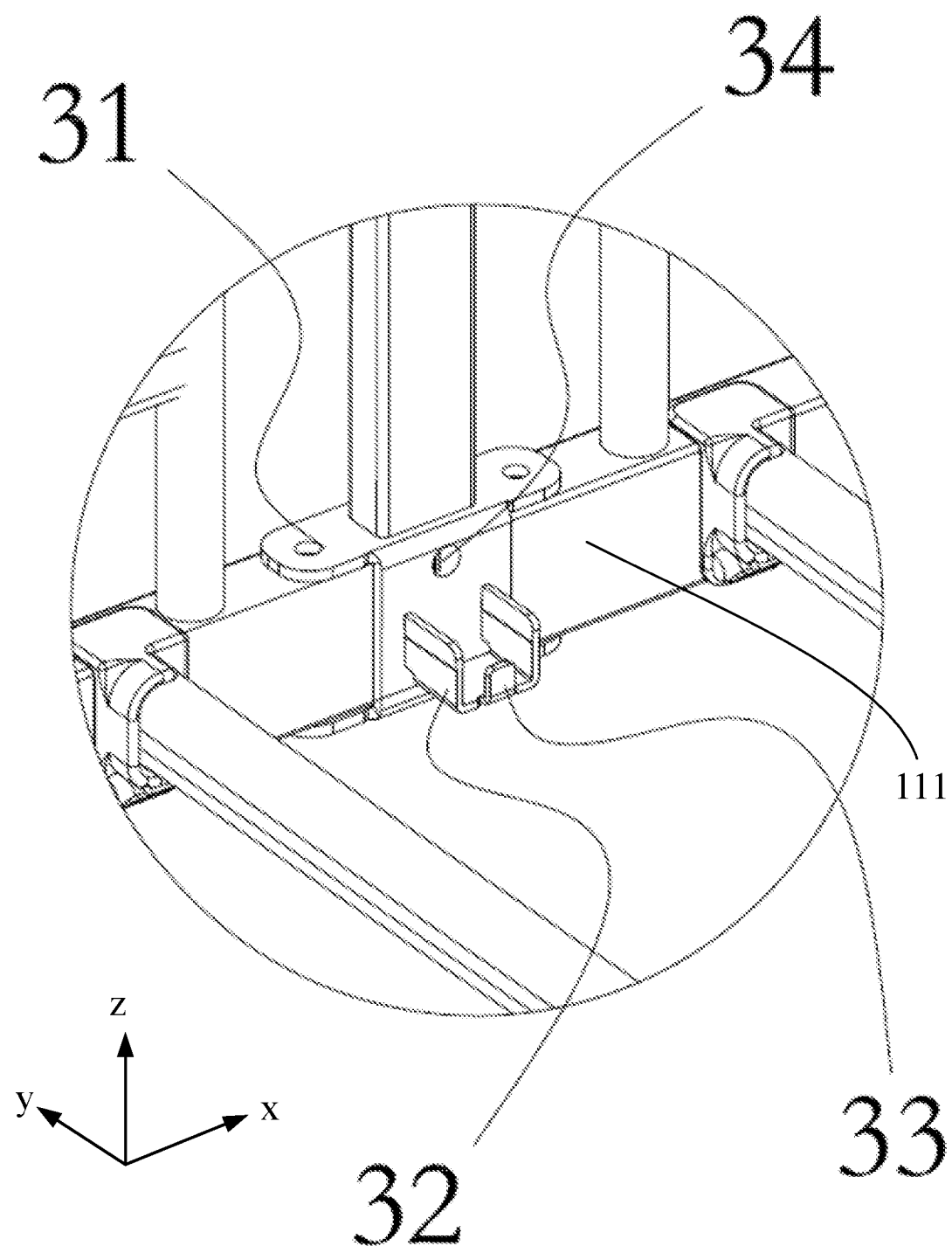
FIG. 5 is an enlarged view taken along circle B of FIG. 4.
Figure 6:
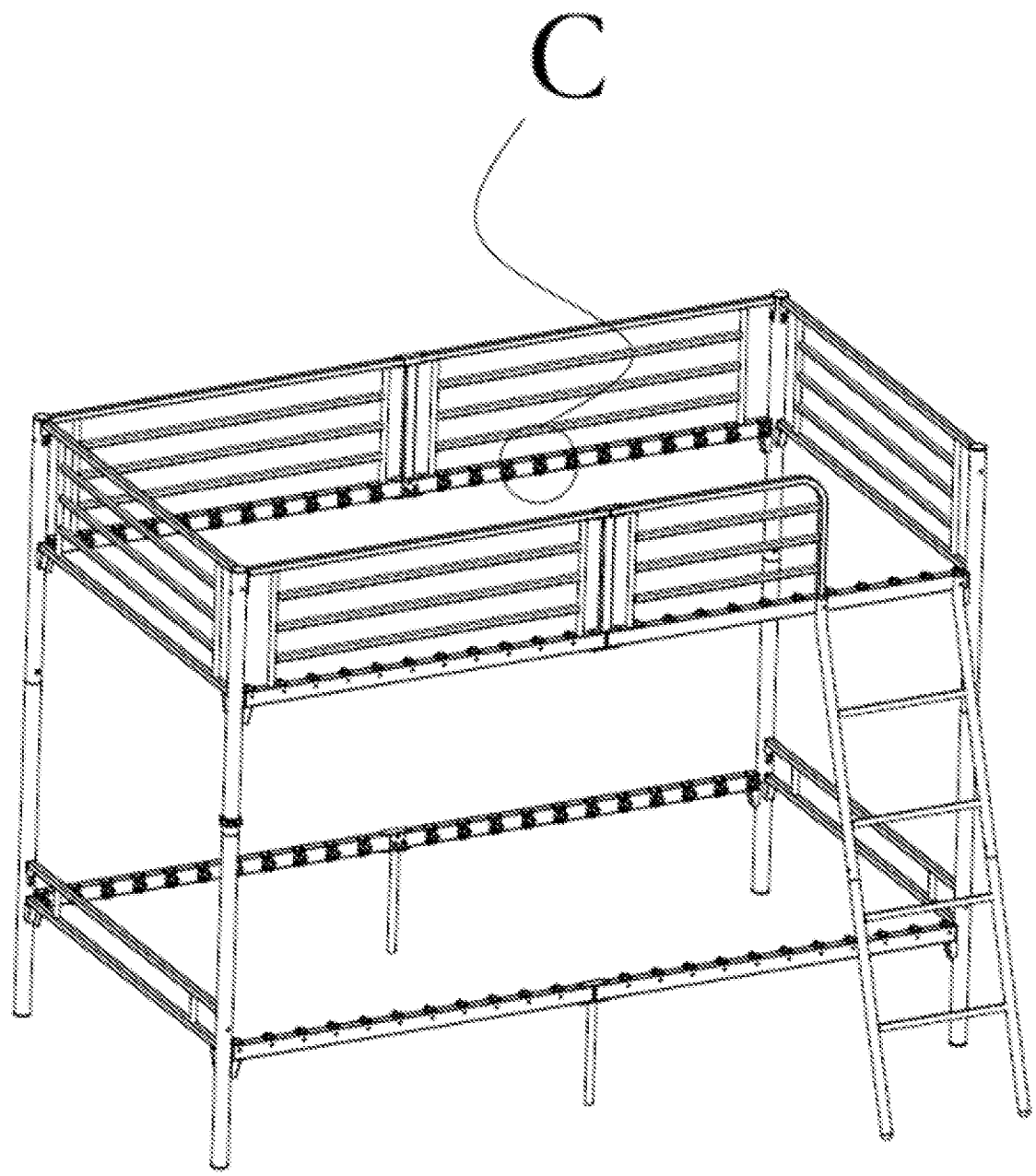
FIG. 6 is a schematic perspective view illustrating the bunk bed frame of FIG. 1 in a third partially disassembled state.

Referring to FIGS. 4 and 5, in some exemplary embodiments, second connector 30 includes a body such as body 31, a deck such as deck 32, a tooth such as tooth 33 and a hole such as hole 34. Body 31 is fixedly connected with the first or second bar, with deck 32 extending in the second direction toward the interior of the frame unit. Tooth 33 is formed at the deck and bent upwardly. Hole 34 is formed at the body and has an opening facing the interior of the frame unit.

Figure 8:
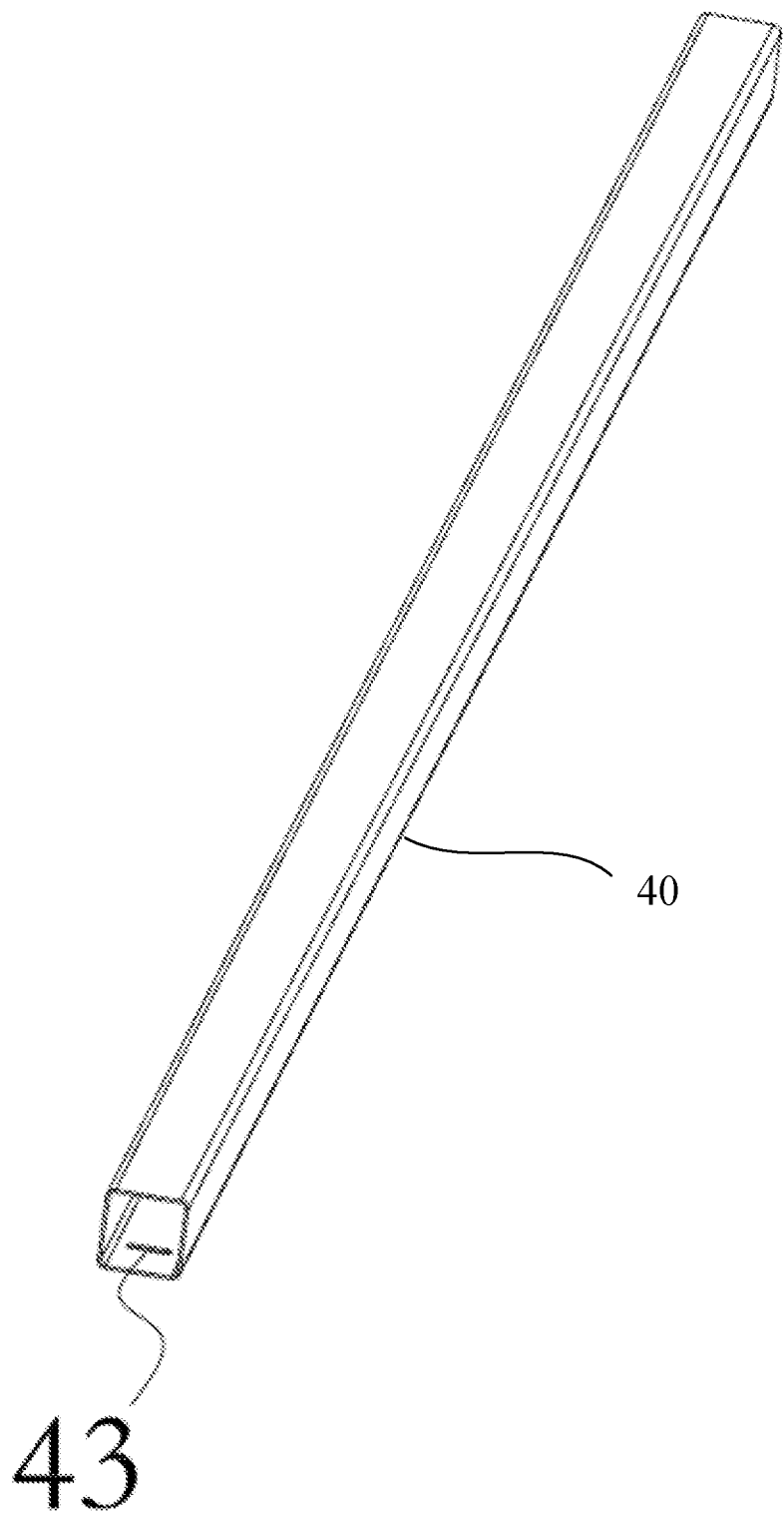
FIG. 8 is a schematic perspective view illustrating a bar in accordance with some exemplary embodiments of the present invention.
Figure 9:
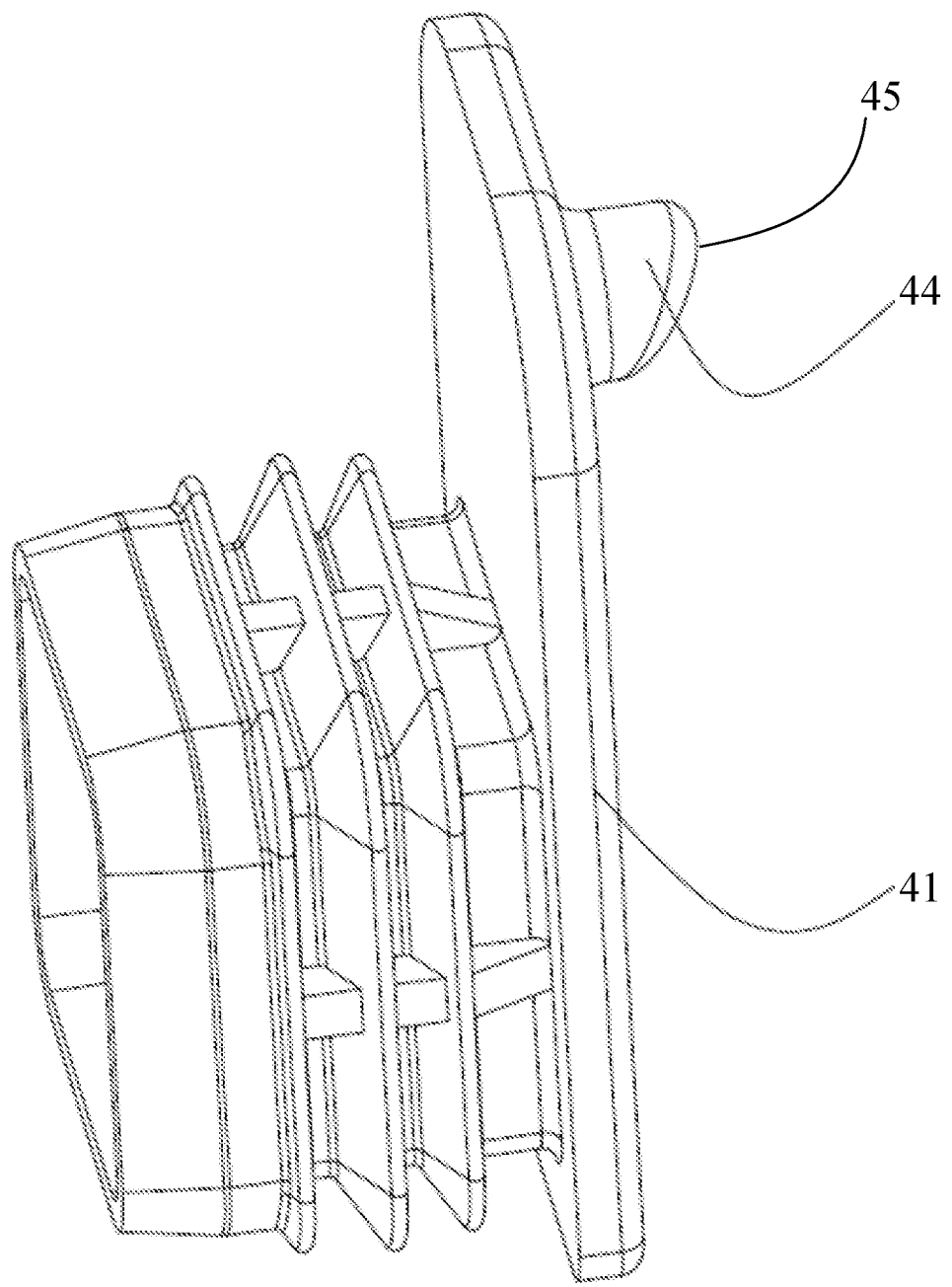
FIG. 9 is a schematic perspective view illustrating a coupler in accordance with some exemplary embodiments of the present invention.

Referring to FIGS. 8 and 9, the end (e.g., the first or second end) of fourth bar 40 is placed on deck 32 of connector 30 and supported by the deck. In some exemplary embodiments, the end of the fourth bar includes a slot such as slot 43 that faces downward to receive tooth 33, and a protrusion to insert into hole 34 of connector 30. The protrusion can be formed at the tip of the end of the fourth bar or at a coupler that is connected with the end of the fourth bar. For instance, by way of example, FIGS. 8 and 9 illustrate coupler 60 including body 41 and protrusion 45 integrally formed with the body. Body 41 is coupled with the end of the fourth bar, for instance, by press-fitting or snap-fitting (e.g., inserting at least a portion of the body into the end of the fourth bar). In an exemplary embodiment, protrusion 45 has end surface 46 slanted from an upper portion to a lower portion of the protrusion. Slanted end surface 46 simplifies inserting protrusion 45 into hole 34 of connector 30 when connecting the fourth bar with the first or second bar. For instance, one can place the end of fourth bar 40 or the end of fourth bar with the coupler above connector 30 and then push it downwardly. As such, tooth 33 inserts into slot 43 of the fourth bar, and with slanted end surface 46, protrusion 45 easily slides into hole 34 of connector 30. With tooth 33 inserted into slot 43 of the fourth bar and protrusion 45 into hole 34 of connector 30, the fourth bar is fixedly connected with the first or second bar.

The frame units of the present disclosure are advantageous over conventional frames or frame units. For instance, the configuration of connector 20 (in particular, the casing) increases the contact area between connector 20 and the end of third bar 10, thereby enhancing the stability of the connection between the connector and the third bar. Moreover, the configuration of the slot allows the narrow side of the end of the third bar to enter into the casing, and then the configuration of the casing allows the end of the third bar to rotate (e.g., in a clockwise or counter-clockwise direction) until the narrow and wide sides of the end of the third bar are aligned with the narrow and wide sides of the casing. At this stage, the casing limits the movement of the end of third bar 30 within the casing of the connector and prevents translational movement of the end of third bar 10 in the first and third directions. As such, it further enhances the stability of the connection between the connector and the third bar, and thus ensures the frame unit to provide an even and balanced bed surface. Further, connector 30 fixedly connects the fourth bar with the first and second bars, and prevents the fourth bar from moving in all of the three (e.g., first, second and third) directions. This further enhances the stability of the bed frame.

The frame units of the present disclosure can be used alone or combined to make various different types of bed frames including but not limited to foldable bed frames and bunk bed frames. The frame units of the present disclosure can also be combined with one or more other frame units (e.g., a frame unit configured differently from the frame units disclosed herein). For instance, a frame unit of the present disclosure can be combined with another frame unit (either configured the same as or differently from those disclosed herein) to make a bunk bed.

Figure 2:
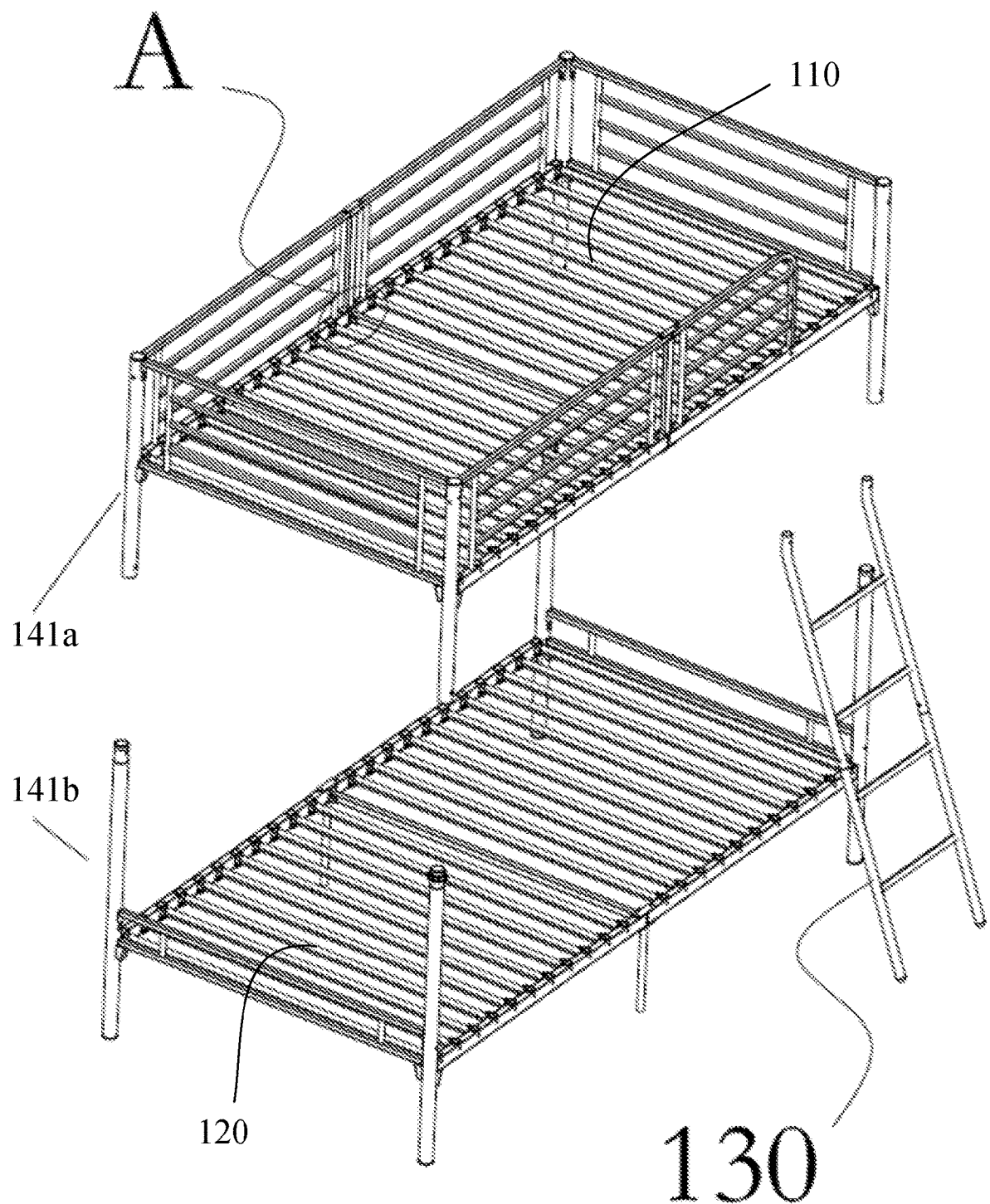
FIG. 2 is a schematic perspective view illustrating the bunk bed frame of FIG. 1 in a first partially disassembled state.
Figure 3:
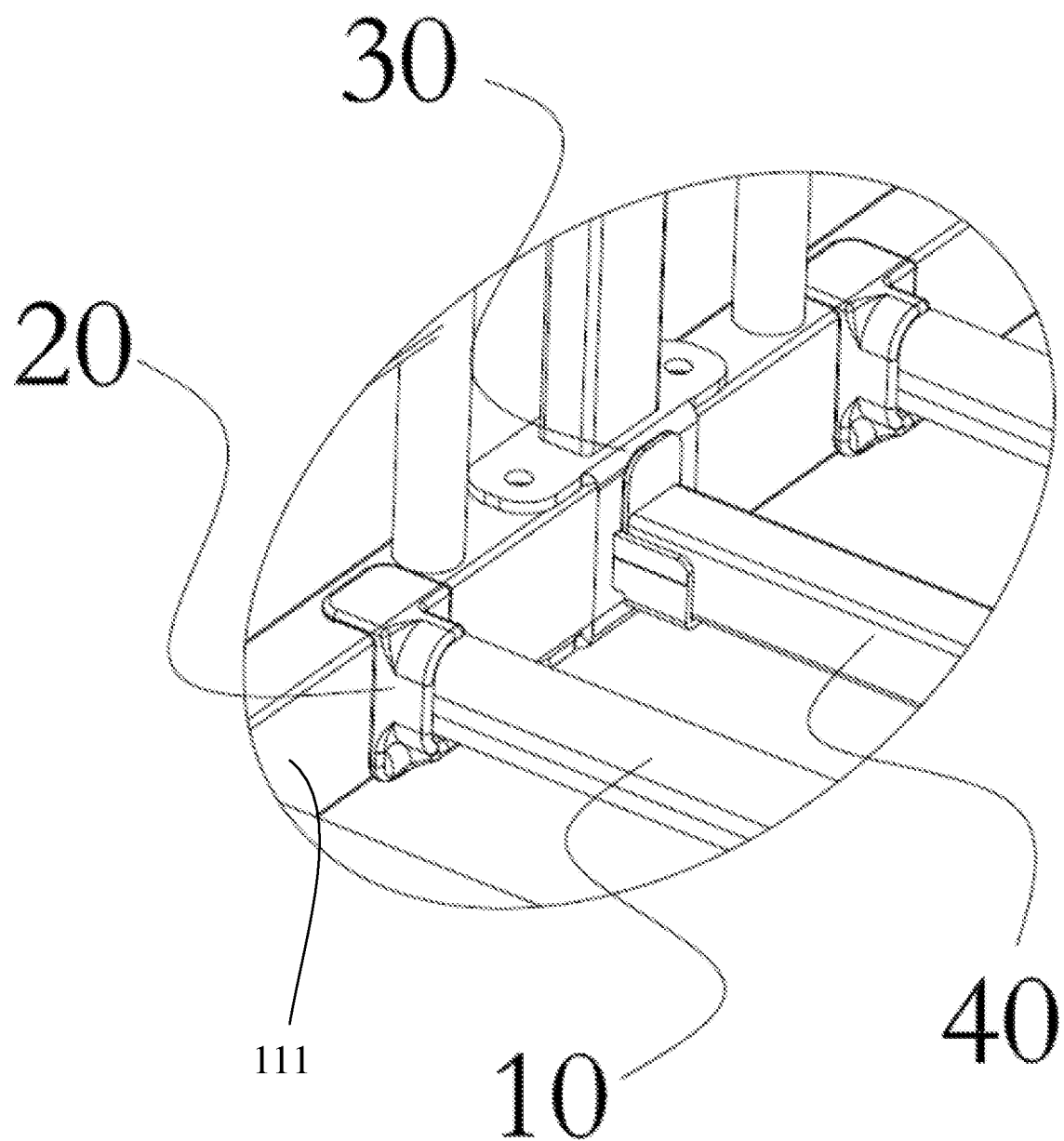
FIG. 3 is an enlarged view taken along circle A of FIG. 2.

For instance, by way of example, FIGS. 1 and 2 illustrate a bunk bed frame including an upper frame and a lower frame unit disposed below the upper frame unit. The upper and lower frame units can be configured substantially the same as or differently from each other. As an example, FIGS.

1 and 2 illustrate upper frame unit 110 and lower frame unit 120 that are configured substantially the same as each other.

The bunk bed frame also includes a plurality of posts such as first post 141, second post 142, third post 143 and fourth post 144 for connecting and supporting the upper and lower frame units. In some exemplary embodiments, each of the first, second, third and fourth posts includes an upper segment and a lower segment. For instance, first post 141 includes upper segment 141a and lower segment 141b. In such embodiments, the upper frame unit is connected with the upper segments of the posts and the lower frame unit is connected with the lower segments of the posts. In an exemplary embodiment, the upper and lower segments of one or each post are integrally formed with each other. In another exemplary embodiment, the upper and lower segments of one or each post are separated parts and connected at adjacent ends, for instance, by inserting the lower end of the upper segment into the upper end of the lower segment or by inserting the upper end of the lower segment into the lower end of the upper segment. In an exemplary embodiment, the lower end of the upper segment and the upper end of the lower segment are fastened by a fastener.

In some exemplary embodiments, the first bar of upper frame unit 110 has a first end connected with the upper segment of the first post and a second end connected with the upper segment of the second post. The second bar of upper frame unit 110 has a first end connected with the upper segment of the third post and a second end connected with the upper segment of the fourth post. The first bar of lower frame unit 120 has a first end connected with the lower segment of the first post and a second end connected with the lower segment of the second post. The second bar of lower frame unit 120 has a first end connected with the lower segment of the third post and a second end connected with the lower segment of the fourth post.

In some exemplary embodiments, the bunk bed frame includes a ladder such as ladder 130 to allow access to the upper frame unit. In an exemplary embodiment, the ladder has an upper end connected with the upper frame unit, e.g., a peripheral bar of the upper frame unit.

In some exemplary embodiments, the bunk bed frame includes a guardrail such as guardrail 115 to prevent a user from falling off. In an exemplary embodiment, the guardrail is connected with one or more of the upper segments of the first, second, third and fourth posts and encases circumferentially at least a portion of the upper frame unit.

To assemble the bunk bed frame, the first and second bars of upper frame unit 110 are connected with the upper segments of the first, second, third and fourth posts, and the first and second bars of lower frame unit 110 with the lower segments of the first, second, third and fourth posts. If the upper and lower segments of the posts are separate parts, the upper segments of the posts are placed above the lower segments of the posts and connected with the upper and lower segments of the posts. The third bars are connected with the first and second bars by inserting the ends of the third bars into the casings through the slots of the first connectors. The fourth bar is connected with the first and second bar by placing the ends of the fourth bar above the second connector and pushing it downwardly until the tooth of the second connector is inserted into the slot of the fourth bar and the protrusion is inserted into the hole of the second connector. The connections can be performed in any suitable order or according to a user's preference.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "left" or "right", "longitudinal" or "lateral", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first frame unit could be termed a second frame unit, and, similarly, a second frame unit could be termed a first frame unit, without changing the meaning of the description, so long as all occurrences of the "first frame unit" are renamed consistently and all occurrences of the "second frame unit" are renamed consistently.

What is claimed is:

1. A frame unit comprising:
    a first bar and a second bar disposed in a first direction and spaced apart from each other;
    a plurality of third bars disposed between the first and second bars in a second direction that is substantially perpendicular to the first direction, wherein
        each third bar in the plurality of third bars comprises a first end adjacent to the first bar and a second end adjacent to the second bar, and
        each of the first and second ends has an oblong cross-section with a narrow side and a wide side, wherein the narrow side has a width and the wide side has a length greater than the width; and
    a plurality of first connectors configured to connect the first ends of the plurality of third bars with the first bar and connect the second ends of the plurality of third bars with the second bar, wherein a respective first connector in the plurality of first connectors comprises:
        a body fixedly connected with the first or second bar;
        a casing integrally formed with the body and extending in the second direction, the casing defining an interior to receive the first or second end of a corresponding third bar in the plurality of third bars; and
        a slot formed between a first edge and a second edge of the casing,
    wherein the slot has a width that is equal to or greater than the width of the oblong cross-section of the first or second end of the corresponding third bar and less than the length of the oblong cross-section of the first or second end of the corresponding third bar, thereby allowing the first or second end of the corresponding third bar to insert into the casing or remove from the casing when the narrow side of the oblong section of the first or second end of the corresponding third bar is aligned with the slot, and
    wherein the interior defined by the casing has a narrow side and a wide side corresponding to the narrow side and the wide side of the oblong section of the first or second end of the corresponding third bar, thereby preventing translational movement of the first or second end of the corresponding third bar within the interior when the narrow and wide sides of the oblong section of the first or second end of the corresponding third bar are aligned with the narrow and wide sides of the interior defined by the casing.

2. The frame unit of claim 1, wherein the interior defined by the casing of the respective first connector has an oblong cross-section corresponding to the oblong cross-section of the first or second end of the corresponding third bar such that the casing sleeves on the first or second end of the corresponding third bar.

3. The frame unit of claim 2, wherein the casing covers circumferentially a portion of the first or second end of the corresponding third bar.

4. The frame unit of claim 1, wherein the casing comprises:
a lower holding segment to support the first or second end of the corresponding third bar;
a first lower corner segment at a first side of the lower holding segment along the first direction; and
a second lower corner segment at a second side of the lower holding segment along the first direction,
wherein the first and second lower corner segments prevent translational movement of the first or second end of the corresponding third bar within the interior along the first direction.

5. The frame unit of claim 4, wherein the casing further comprises:
an upper segment to prevent translational movement of the first or second end of the corresponding third bar within the interior along a third direction that is substantially perpendicular to the first and second direction.

6. The frame unit of claim 5, wherein the casing further comprises:
a side segment between the upper segment and the second lower corner segment and connected with the upper segment and the second lower corner segment.

7. The frame unit of claim 5, wherein the slot is formed between the upper segment and the first lower corner segment.

8. The frame unit of claim 4, wherein the lower holding segment is formed between the first lower corner segment and the second lower corner segment and connected with the first lower corner segment and the second lower corner segment.

9. The frame unit of claim 1, further comprising:
a fourth bar disposed between the first and second bars in the second direction and comprising a first end adjacent to the first bar and a second end adjacent to the second bar, wherein each of the first and second ends of the fourth bar comprises a slot facing downward and a protrusion facing the first or second bar; and
a pair of second connectors configured to connect the first and second ends of the fourth bar with the first and second bars, wherein each second connector comprises:
a body fixedly connected with the first or second bar;
a deck extending in the second direction to support the first or second end of the fourth bar;
a tooth formed at the deck and bended upwardly to insert into the slot of the first or second end of the fourth bar; and
a hole formed at the body to receive the protrusion of the first or second end of the fourth bar.

10. The frame unit of claim 1, further comprising:
a fourth bar disposed between the first and second bars in the second direction and comprising a first end adjacent to the first bar and a second end adjacent to the second bar, wherein each of the first and second ends of the fourth bar comprises a slot facing downward;

a pair of couplers, each comprising a body coupled with the first or second end of the fourth bar and a protrusion integrally formed with the body thereof and facing the first or second bar; and
a pair of second connectors configured to connect the first and second ends of the fourth bar with the first and second bars, wherein each second connector comprises:
a body fixedly connected with the first or second bar;
a deck extending in the second direction to support the first or second end of the fourth bar;
a tooth formed at the deck and bended upwardly to insert into the slot of the first or second end of the fourth bar; and
a hole formed at the body to receive the protrusion of the coupler at the first or second end of the fourth bar.

11. The frame unit of claim 10, wherein the coupler is press-fitted or snap-fitted with the first or second end of the fourth bar.

12. A bunk bed frame comprising:
first, second, third and fourth posts, each comprising an upper segment and a lower segment;
an upper frame unit connected with the upper segments of the first, second, third and fourth posts;
a lower frame unit disposed below the upper frame unit and connected with the lower segments of the first, second, third and fourth posts; and
a ladder having an upper end connected with the upper frame unit to allow access to the upper frame unit,
wherein at least one of the upper and lower frame units is configured according to the frame unit of claim 1, wherein the first bar has a first end connected with the first post and a second end connected with the second post, and the second bar has a first end connected with the third post and a second end connected with the fourth post.

13. The bunk bed frame of claim 12, wherein the upper and lower segments of a respective post in the first, second, third and fourth posts are integrally formed with each other.

14. The bunk bed frame of claim 12, wherein the upper and lower segments of a respective post in the first, second, third and fourth posts are separate parts and connected at adjacent ends thereof.

15. The bunk bed frame of claim 14, wherein a lower end of the upper segment is inserted into an upper end of the lower segment, or the upper end of the lower segment is inserted into the lower end of the upper segment.

16. The bunk bed frame of claim 12, further comprising a guardrail connected with one or more of the upper segments of the first, second, third and fourth posts.

17. The frame unit of claim 1, wherein the casing covers circumferentially up to about 50%, 60%, 70%, 80% or 90% of the first or second end of the corresponding third bar.

18. A bunk bed frame comprising:
first, second, third and fourth posts, each comprising an upper segment and a lower segment;
an upper frame unit connected with the upper segments of the first, second, third and fourth posts;
a lower frame unit disposed below the upper frame unit and connected with the lower segments of the first, second, third and fourth posts; and
a ladder having an upper end connected with the upper frame unit to allow access to the upper frame unit,
wherein each of the upper and lower frame units is configured according to the frame unit of claim 1.

* * * * *